United States Patent
Bierbaum et al.

(10) Patent No.: US 8,181,867 B1
(45) Date of Patent: May 22, 2012

(54) TRANSIT CARD CREDIT AUTHORIZATION

(75) Inventors: Christopher J. Bierbaum, Overland Park, KS (US); Robin Dale Katzer, Olathe, KS (US); Todd N. Koellner, Overland Park, KS (US); Kevin Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 752 days.

(21) Appl. No.: 12/349,513

(22) Filed: Jan. 6, 2009

(51) Int. Cl.
G07B 15/02 (2011.01)
G06F 17/00 (2006.01)
G06F 7/08 (2006.01)
G06K 5/00 (2006.01)
G06K 19/06 (2006.01)

(52) U.S. Cl. ........ 235/384; 235/375; 235/380; 235/381; 235/492; 705/13

(58) Field of Classification Search ................ 235/375, 235/380–384, 492; 705/13, 64–65
See application file for complete search history.

(56) References Cited

U.S. PATENT DOCUMENTS

| | | | |
|---|---|---|---|
| 5,298,726 A | 3/1994 | Aubrey | |
| 5,590,038 A | 12/1996 | Pitroda | |
| 5,819,234 A | 10/1998 | Slavin et al. | |
| 5,991,749 A | 11/1999 | Morrill, Jr. | |
| 6,003,776 A | 12/1999 | Drupsteen | |
| 6,736,317 B1 * | 5/2004 | McDonald et al. | 235/384 |
| 7,224,291 B2 | 5/2007 | Hassett | |
| 7,356,541 B1 | 4/2008 | Doughty | |
| 7,527,208 B2 * | 5/2009 | Hammad et al. | 235/492 |
| 7,562,818 B1 | 7/2009 | Bierbaum et al. | |
| 7,587,332 B2 | 9/2009 | Andrews et al. | |
| 7,797,248 B1 | 9/2010 | Bierbaum et al. | |
| 7,911,382 B2 | 3/2011 | Liu et al. | |
| 7,922,084 B2 * | 4/2011 | Ishibashi et al. | 235/382 |
| 8,126,769 B1 | 2/2012 | Bierbaum et al. | |
| 2002/0002534 A1 * | 1/2002 | Davis et al. | 705/39 |
| 2002/0004762 A1 | 1/2002 | Izumoto | |

(Continued)

FOREIGN PATENT DOCUMENTS

GB 2152720 A 8/1985

OTHER PUBLICATIONS

Balaban, Dan, "Japan Goes Mobile With Transit Ticketing," Card Technology, May 2006, vol. 11, Issue 5, pp. 18-20.

(Continued)

*Primary Examiner* — Thien M. Le
*Assistant Examiner* — April Taylor

(57) ABSTRACT

A system is provided for transit card credit authorization. An authorization component on a mobile device determines whether a balance on a transit card application on the mobile device is below a threshold, and determines whether a communication signal is too weak to request an approval for a balance increase from a server in response to a determination that the balance on the transit card application is below the threshold. The authorization component also determines whether credit data on the mobile device authorizes increasing the balance in response to a determination that the communication signal is too weak to request the approval for the balance increase from the server, and authorizes increasing the balance in response to a determination that the credit data authorizes increasing the balance. A fare gate enables access for the mobile device at the fare gate in response to the authorization component authorizing increasing the balance.

20 Claims, 6 Drawing Sheets

U.S. PATENT DOCUMENTS

| | | | |
|---|---|---|---|
| 2002/0133409 | A1 | 9/2002 | Sawano et al. |
| 2002/0161729 | A1 | 10/2002 | Andrews |
| 2003/0019927 | A1 | 1/2003 | Lindgren et al. |
| 2004/0016801 | A1 | 1/2004 | Newsome et al. |
| 2004/0139018 | A1* | 7/2004 | Anderson et al. ............... 705/41 |
| 2005/0125317 | A1 | 6/2005 | Winkelman et al. |
| 2006/0189297 | A1 | 8/2006 | Jung |
| 2007/0034107 | A1 | 2/2007 | Barbeau et al. |
| 2007/0150949 | A1 | 6/2007 | Futamura et al. |
| 2007/0210936 | A1 | 9/2007 | Nicholson |
| 2008/0068221 | A1 | 3/2008 | Park |
| 2008/0116264 | A1 | 5/2008 | Hammad et al. |
| 2008/0156873 | A1 | 7/2008 | Wilhelm et al. |
| 2008/0201212 | A1* | 8/2008 | Hammad et al. ................ 705/13 |
| 2008/0208681 | A1 | 8/2008 | Hammad et al. |
| 2009/0002237 | A1 | 1/2009 | Nonoyama |
| 2009/0015398 | A1 | 1/2009 | Bhogal et al. |
| 2010/0121563 | A1 | 5/2010 | Chavez et al. |
| 2010/0292921 | A1 | 11/2010 | Zachariah et al. |

OTHER PUBLICATIONS

Bierbaum, Christopher J., et al., Patent Application entitled "Single Transit Card to Multiple Rider Trip Methods and Architecture," filed Dec. 22, 2008, U.S. Appl. No. 12/342,066.

Bierbaum, Christopher J., et al., Patent Application entitled "Transit Card State Sequence Self-Help Correction," filed Aug. 7, 2008, U.S. Appl. No. 12/187,953.

Bierbaum, Christopher J., et al., Patent Application entitled "Transit Payment and Handset Navigation Integration," filed Jan. 6, 2009, U.S. Appl. No. 12/349,509.

Gregoire, Lisa, "Visa Removes Canada 3000 Credit Charge," Edmonton Journal, Mar. 9, 2002, p. B.7, Edmonton, Alta.

Office Action dated May 10, 2010, U.S. Appl. No. 12/187,953, filed Aug. 7, 2008.

Final Office Action dated Oct. 20, 2010, U.S. Appl. No. 12/187,953, filed Aug. 7, 2008.

Office Action dated Feb. 17, 2011, U.S. Appl. No. 12/187,953, filed Aug. 7, 2008.

Office Action with Restriction Requirement dated Jun. 1, 2011, U.S. Appl. No. 12/342,066, filed Dec. 22, 2008.

Office Action dated Aug. 4, 2011, U.S. Appl. No. 12/342,066, filed Dec. 22, 2008.

Final Office Action dated Aug. 4, 2011, U.S. Appl. No. 12/187,953, filed Aug. 7, 2008.

Office Action dated Jun. 22, 2011, U.S. Appl. No. 12/349,509, filed Jan. 6, 2009.

Final Office Action dated Jan. 4, 2012, U.S. Appl. No. 12/342,066, filed Dec. 22, 2008.

Notice of Allowance dated Oct. 17, 2011, U.S. Appl. No. 12/187,953, filed Aug. 7, 2008.

Office Action—Restriction Requirement dated Dec. 20, 2011, U.S. Appl. No. 12/349,509, filed Jan. 6, 2009.

* cited by examiner

TRANSIT CARD CREDIT AUTHORIZATION

CROSS-REFERENCE TO RELATED APPLICATIONS

This application includes subject matter related to the following application, which is hereby incorporated by reference: U.S. patent application Ser. No. 11/752,028, filed May 22, 2007, entitled "Mobile Device Having a Transit Card Application," by Christopher Bierbaum, et al.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Transaction devices are portable items that store data, such as credit cards, debit cards, gift cards, access cards, and cards for various prepaid services or goods. Magnetically encoded transaction devices typically store data in a magnetic strip. A transaction device can be a transit card that is issued by a transit authority, such as a subway system. A transit card may store value that is used to make automatic payments at, for example, subway station fare gates, thereby providing access to restricted areas.

A transit card may be a "proximity read" transit card, which may communicate with a card reader without physically contacting the card reader. Communication between a proximity read transit card and various types of card readers may occur via a radio frequency signal, optical signal, wireless internet connection, infra-red communication, or other communication method known in the art or hereafter developed. As a user of a transit card passes through a fare gate, a card reader may cause value to be automatically deducted from value stored on the transit card.

The fare gate can determine whether the balance of the value remaining on the transit card is below a threshold amount. The threshold amount might be set, for example, to an average fare cost of a typical or average trip. If the value is below the threshold, the fare gate can verify whether a predetermined payment source, such as a credit card, has been provided to pay for increasing the value stored on the transit card. If a predetermined payment source has been provided, the fare gate can provide access through the fare gate to the user of the transit card, and charge the predetermined payment source and transfer funds to "top up" the value on the transit card by increasing the value stored on the transit card by a specified amount.

The fare gate has time to verify whether the transit card is a type of transit card that can have its balance increased by the fare gate. However, the fare gate does not have time to verify whether a predetermined payment source has sufficient balance or credit to provide for the balance increase on the transit card. The fare gate may send requests to verify whether predetermined payment sources have sufficient balance to the transit authority's data processing system. The transit authority's data processing system may batch these requests for verification at a later time when data processing systems are less congested, such as after midnight. If the predetermined payment source for a transit card has exceeded its credit limit, the transit authority's data processing system may not verify this insufficient balance until after midnight, which can result in the fare gates continuing to allow access to the user of the transit card for the rest of the day. The transit authority may not be able to subsequently collect for many of these prematurely approved balance increases, which may cost the transit authority significant amounts in lost revenue.

SUMMARY

In some embodiments, a system is provided for transit card credit authorization. An authorization component on a mobile device determines whether a balance on a transit card application on the mobile device is below a threshold, and determines whether a communication signal is too weak to request an approval for a balance increase from a server in response to a determination that the balance on the transit card application is below the threshold. The authorization component also determines whether credit data on the mobile device authorizes increasing the balance in response to a determination that the communication signal is too weak to request the approval for the balance increase from the server, and authorizes increasing the balance in response to a determination that the credit data authorizes increasing the balance. A fare gate enables access for the mobile device at the fare gate in response to the authorization component authorizing increasing the balance.

In some embodiments, a method is provided for transit card credit authorization. A determination is made whether a balance on a transit card application on a mobile device is below a threshold. If the balance on the transit card application is below the threshold, a determination is made whether a communication signal is too weak to request an approval for a balance increase from a server. If the communication signal is not too weak to request the approval for the balance increase from the server, the approval for the balance increase is requested from the server, and the approval for the balance increase is received from the server. If the communication signal is too weak to request the approval for the balance increase from the server, a determination is made whether credit data on the mobile device authorizes to write a secure command to the transit card application. If the credit data authorizes to write the secure command to the transit card application or the approval for the balance increase is received from the server, a secure command is written to the transit card application, the balance is increased, and access for the mobile device is enabled at the fare gate.

In some embodiments, a system is provided for transit card credit authorization. The system includes credit data on a mobile device and an authorization component on the mobile device. The authorization component determines whether a balance on a transit card application on the mobile device is below a threshold, and determines whether a communication signal is too weak to request an approval for a balance increase from a server in response to a determination that the balance on the transit card application is below the threshold. The authorization component also determines whether the credit data authorizes to write a secure command to the transit card application in response to a determination that the communication signal is too weak to request the approval for the balance increase from the server, and writes a secure command to the transit card application in response to a determination that the credit data authorizes to write the secure command to the transit card application. A fare gate increases the balance in response to the authorization component writing the secure command to the transit card application, and enables access for the mobile device at the fare gate.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
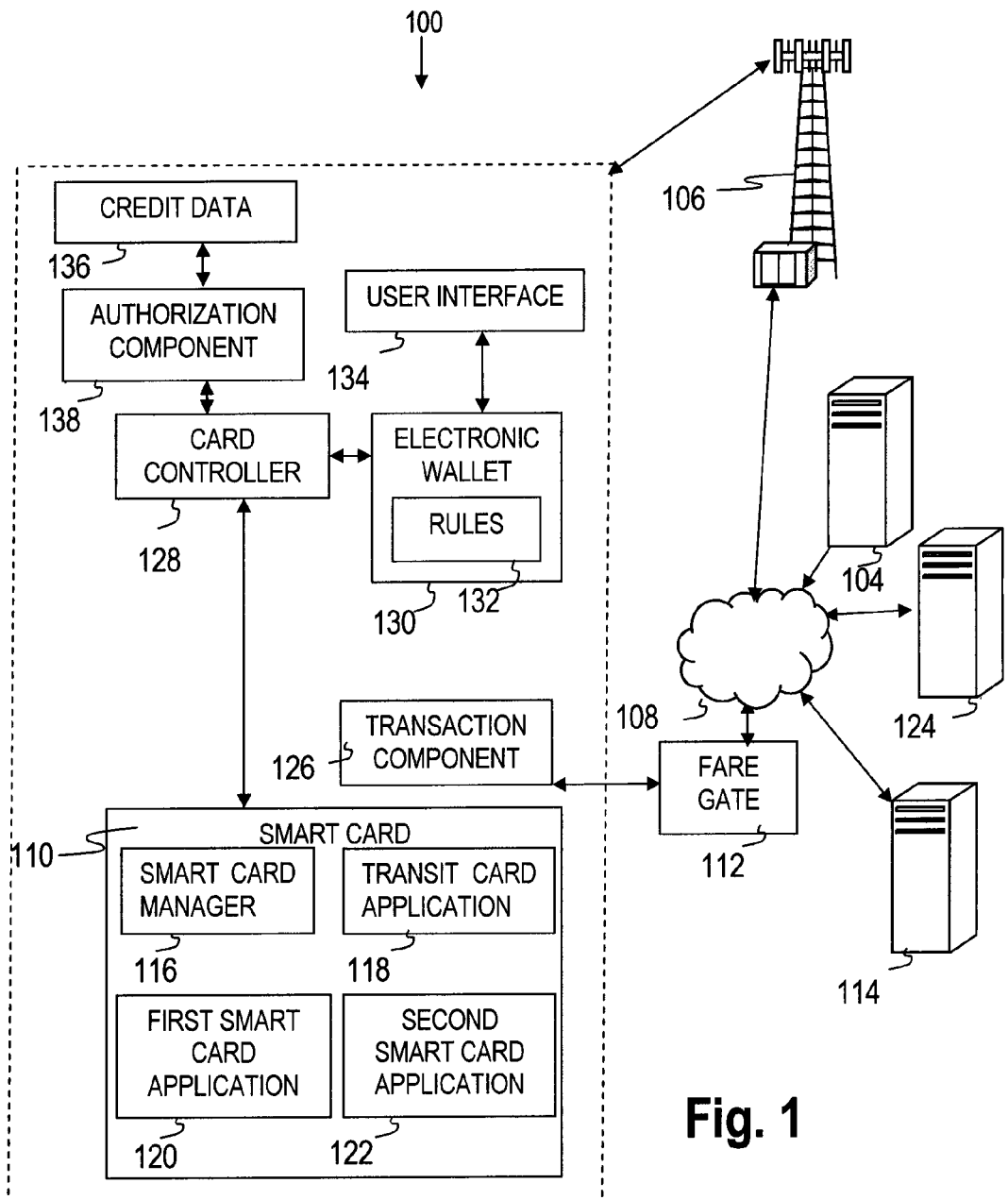
FIG. 1 shows a block diagram of a system for a transit card credit authorization according to some embodiments of the present disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A mobile device, such as a mobile phone, may include a transit card. Thus, if a card reader is present at a location where proximity read transit cards are used, the transit card in the mobile device may make payments, provide access to restricted areas, and perform other functions or transactions typically performed by transit cards. A mobile device may implement the functionality of a transit card by containing a "smart card" that contains a transit card application. A smart card is a transaction device that stores data in nonvolatile memory, and typically contains data processing circuitry that offers some degree of computing capacity. A transit card application is an application that runs in a smart card environment and emulates the functions of a transit card.

A mobile device may determine whether a balance on a transit card application is below a threshold. If the balance on the transit card application is below the threshold, the mobile device may communicate wirelessly with a server, for example via a wireless communication link provided by a base transceiver station in a public land mobile network (PLMN), to request an approval for a balance increase. The server may approve the request if a predetermined payment source has sufficient value for the balance increase. The mobile device may respond to an over the air approval by the server by promoting increasing the balance on the transit card application.

Embodiments of the present disclosure enable a balance increase on a transit card application even when the PLMN communication signal for the mobile device that includes the transit card application is too weak to request the balance increase over the air. The reception of PLMN communication signals for mobile devices may be too weak for requesting an approval over the air in many transit stations due to local radio environmental conditions, such as multi-path or blockage by foliage, buildings, etc. If the communication signal is too weak for such a request, an authorization component on the mobile device may check credit data that was previously received and stored on the mobile device. If the periodically updated credit data indicates that the mobile device user is likely to pay for the balance increase, the authorization component authorizes the balance increase. The fare gate responds to the authorization by granting the mobile device access to the fare gate. If the credit data does not indicate that the mobile device user is likely to pay for the balance increase, the authorization component does not authorize the balance increase, and the fare gate does not grant the mobile device access to the fare gate. The fare gate may be directly involved in implementing the balance increase, or merely respond to the balance increase implemented by another component in the system.

The authorization component can wait until the communication signal improves sufficiently to subsequently prompt the mobile device to communicate over the air with the server to request an approval for the increased balance. The balance increase may be based on charging a predetermined payment source, such as a credit card accessible by the server, based on adding the amount of the balance increase to the mobile device's monthly service bill from a mobile device service provider, or based on transferring funds from a specified smart card application resident on the mobile device. Promptly verifying whether the credit data indicates the likelihood of payment provides access to mobile device users with good credit histories while significantly reducing the chances that fare gates provide access to transit card users without subsequent payment of fares.

FIG. 1 shows a block diagram of a system 100 for transit card credit authorization according to some embodiments of the present disclosure. The system 100 includes a mobile device 102 that communicates with a server 104 via a base transceiver station (BTS) 106 and a network 108. The mobile device 102 includes a smart card 110 that enables smart card transactions with a fare gate 112, which may communicate with a fare gate server 114 via the network 108. Although FIG. 1 depicts only one fare gate 112 communicating with the fare gate server 114, the system may include any number of fare gates 112 communicating with the fare gate server 114.

The smart card 110 may include a smart card manager 116 to assist a user in managing transit card applications, such as a transit card application 118, a first smart card application 120, and a second smart card application 122. Additionally, a payment source server 124 may assist a user in managing the transit card and smart card applications 118-122 via the network 108. The transit card application 118 is a smart card application that can include digital cash. The smart card applications 120 and 122 can be either a loyalty card, an identification card, a credit card, a coupon card, a security card, a debit card, a bank account card, or a cash card. While one transit card and two smart card applications 118-122 are shown in FIG. 1, other numbers are also contemplated.

The mobile device 102 may include a transaction component 126 to enable the smart card 110 to communicate with a vendor device by radio frequency, optical, infra-red, wired, magnetic "contact reader," or other known or hereafter developed communications. The vendor device may be a point of sale, security, or any other vendor transaction device, such as the fare gate 112. The security for the smart card 110 may be enabled by hardware or software components on the mobile device 102, as part of the smart card 110, or combinations of both.

The ISO/IEC 7816 and ISO/IEC 7810 series of standards for contact smart cards define: the physical shape, the positions and shapes of the electrical connectors, the electrical characteristics, the communications protocols, the format of the commands sent to the card and the responses returned by the card, robustness of the card, and partly the functionality. The standard for contactless smart card communications is ISO/IEC 14443, dated 2001. An alternative standard for contactless smart cards is ISO 15693, which allows communications at distances up to 50 cm. However, systems applying other standards may be used and are within the spirit and scope of the present disclosure.

The mobile device 102 contains a card controller 128 and an electronic wallet 130. The card controller 128 may enable the electronic wallet 130 to communicate with the smart card manager 116 on the smart card 110. The card controller 128 is responsible for accessing the hardware registers of the smart card manager 116 and often includes an interrupt handler to service interrupts generated by the smart card manager 116. The electronic wallet 130 is an application that, in addition to providing the mobile device user with information regarding the transit card and smart card applications 118-122, may enable the user to access and select the transit card and smart card applications 118-122 on the smart card 110 for use in carrying out transactions. The electronic wallet 130 contains or has access to a set of context-based rules 132. The electronic wallet 130 may process the rules 132 and context information to determine which of the transit card and smart card applications 118-122 are appropriate for a transaction.

The mobile device 102 may also include a user interface 134, which enables the mobile device user to enter input to and receive output from the mobile device 102, such as displaying a transit schedule and a fare list, or an account number, an account limit, an account balance, and a transaction history for the transit card and smart card applications 118-122. The mobile device 102 may also communicate with the server 104 for mobile device communication. The server 104 can operate automatically, function with human intervention as part of a customer service system, or any combination thereof. The mobile device 102, the user interface 134, and the server 104 are described in more detail below in reference to FIG. 4 to FIG. 7.

The mobile device 102 also includes credit data 136 and an authorization component 138. The credit data 136, which may be stored in a memory of the mobile device 102, is information that may be used by the authorization component 138 to determine the likelihood that the user of the mobile device 102 may pay for the balance increase, and may be based on the mobile device user's history with the mobile device service provider and/or the transit authority. The credit data 136 may include the usage of the transit system by the transit card application 118, timeliness of payments, the length of time that the mobile device user is a customer, a credit score associated with the mobile device user, the average payment amount, the frequency of increasing the balance on the transit card application 118, a report of a cancelled account, and a report of mobile device theft. Alternatively, the credit data 136 may be a simple flag that specifies whether or not to authorize a balance increase on the transit card application 118. The flag may be based on a customer's status, such as limits on spending with the customer's mobile device service provider, reflecting the charges that the customer's mobile device service provider will permit the mobile device 102 to undertake with the expectation of recovering the charges via the monthly invoice. The server 124 provides the credit data 136 to the mobile device 102 on a repeated basis, such as hourly or daily, and the credit data 136 specifies when the server 124 provided the credit data 136 to the mobile device 102. The credit data 136 may also specify an amount for increasing the balance, such as $80.00 rather than the typical $40.00 top-up.

The authorization component 138 may be a software component, a hardware component, or a component that is a combination of software and hardware. If the authorization component 138 determines that the balance on the transit card application 118 is below a threshold and that the communication signal is too weak to request an approval for the balance increase from the server 124, the authorization component 138 determines whether the credit data 136 authorizes increasing the balance.

If credit data 136 authorizes increasing the balance, the authorization component 138 may write a secure command to the transit card application 118. The fare gate 112 may increase the balance and enable access for the mobile device 102 at the fare gate 112 based on detecting the secure command is written to the transit card application 118. A transit card application 118 may not offer direct access to the mobile device 102, but may provide a shared area where the mobile device 102 may write a secure command. For example, the fare gate 112 increases the balance on the transit card application 118 by $40.00 from $9.00 to $49.00 based on detecting the written secure command. Alternatively, either the electronic wallet 130 or the server 124 can increase the balance on the transit card application 118.

The authorization component 138 can periodically determine whether the balance on the transit card application 118 is below the threshold, such as every few seconds, minutes, or hours. Alternatively, the authorization component 138 can determine whether the balance on the transit card application 118 is below the threshold based on an inquiry input by the mobile device user. Additionally, the fare gate 112 can inquire whether the balance on the transit card application 118 is below the threshold. Furthermore, the authorization component 138 might check the balance based on events such as a location proximity to the fare gate 112. In this manner, the authorization component 138 reduces the time when the balance on the transit card application 118 is below the threshold by frequently determining whether the balance on the transit card application 118 is below the threshold. In some embodiments, the user of the mobile device 102 may employ the user interface 134 to set the threshold and/or the balance increase. In other embodiments, however, the transit card application 118, the fare gate 112, or the transit authority, might set the threshold and/or the balance increase.

The authorization component 138 may analyze credit data 136 based on the date and/or time when the server 124 provided the credit data 136 to the mobile device 102. For example, the date and/or time when the credit data 136 was provided by the server 124 and stored on the mobile device 102 may specify that the server 124 most recently provided the credit data 136 to the mobile device 102 one week ago since the mobile device 102 has been disabled from communicating with the server 124. The week-old storage of credit data 136 may indicate that the mobile device 102 has been lost or stolen, or that the mobile device user does not want the mobile device 102 to receive recent credit data 136 that reflects negatively on the mobile device user. Similarly, the analysis of the credit data 136 may be based on the duration of time that the communication signal is too weak. For example, the mobile device user may have put the mobile device 102 in an "airplane mode" which ignores receipt of the communication signal, because the mobile device 102 is lost or stolen, or to avoid receipt of negative credit data 136.

The analysis of the credit data 136 may be based on a total amount of each of the requests for approval for the balance increase while the communication signal is too weak. For example, multiple requests for balance increases while the communication signal is too weak may indicate that the mobile device user is using the mobile device 102 excessively to access the transit system while the communication signal is too weak for the mobile device 102. The server 124 also may determine whether the mobile device 102, and hence the transit card application 118, has not been reported as lost or stolen. If the mobile device 102 is reported as lost or stolen and the server 124 cannot disable the transit card application 118 over the air, the server 124 can communicate the status of the mobile device 102 to the fare gate 112. In response to a report of a stolen or lost mobile device, the fare gate 112 can either disable the transit card application 118 or deny entry to the transit system to the current user of the mobile device 102.

The fare gate 112 may open a gate to permit the user of the mobile device 102 to enter a transit system or open a gate to permit the user of the mobile device 102 to exit the transit system and deduct a value from the transit card application 118. The value deducted from the transit card application 118 can be based on the distance traveled through the transit system, which can be based on the distance between an entry fare gate and an exit fare gate. The fare gate 112 may also send an invoice for the balance increase to the mobile device service provider for the mobile device 102.

When the communication signal is no longer too weak, the authorization component 138 requests a predetermined payment source to provide for the balance that was increased based on the credit data 136. The predetermined payment source can be the smart card applications 120 and 122 on the mobile device 102, a loyalty card, an identification card, a credit card, a coupon card, a security card, a debit card, a bank account, a mobile device service provider bill, or other payment source. For example, the service provider for the mobile device 102 can add the balance increase to the mobile device user's monthly bill. The electronic wallet 130 can automatically default to any predetermined payment source, or the predetermined payment source can be another mobile device 102 that has another electronic wallet 130. If no predetermined payment source has been selected as a default for the balance increase, the mobile device 102 can prompt the user to select the payment source for the balance increase. The payment source may charge an amount to promote increasing the balance which is different from the amount for increasing the balance. For example, if the balance increase is for $40.00, the mobile device service provider charges a $40.00 balance increase and an additional $4.00 balance increase fee, and adds $44.00 to the mobile device service provider bill for the mobile device 102.

The user interface 134 can also inform the user of the mobile device 102 that the balance on the transit card application 118 is below the threshold, which may prompt the mobile device user to delay entering a transit station for a few seconds to give the mobile device 102 sufficient time to request a balance increase and receive approval for the balance increase. Such a prompt may be helpful for mobile device users who are charged for a $40.00 balance increase and an additional $4.00 balance increase fee for a $40.00 balance increase based on the credit data 136.

The authorization component 138 may determine whether a predetermined payment source, such as the first smart card application 120, has sufficient value for increasing the balance. If the predetermined payment source has sufficient value, the authorization component 138 may request the predetermined payment source to promote increasing the balance. If the predetermined payment source does not have sufficient value, the authorization component 138 may enable switching from the predetermined payment source to another predetermined payment source, such as switching from the first smart card application 120 to the second smart card application 122. Although the first smart card application 120 may offer the funds for increasing the balance on the transit card application 118 that is resident on the same smart card 110, the funds may not actually be transferred until the mobile device 102 communicates with the server 124 to process the fund transfer request. Alternatively, the funds could be transferred contemporaneously with the initial request to increase the balance, whereby the transfer is reported when the mobile device 102 communicates with the server 124.

Prior to any requests for balance increases, a user of the mobile device 102 may select the predetermined payment source and the other predetermined payment source, such as the first smart card application 120 as a default predetermined payment source and the second smart card application 122 as the backup predetermined payment source. The mobile device 102 may display selections of other predetermined payment sources on the user interface 134 from which the user of the mobile device 102 can select.

Figure 2:
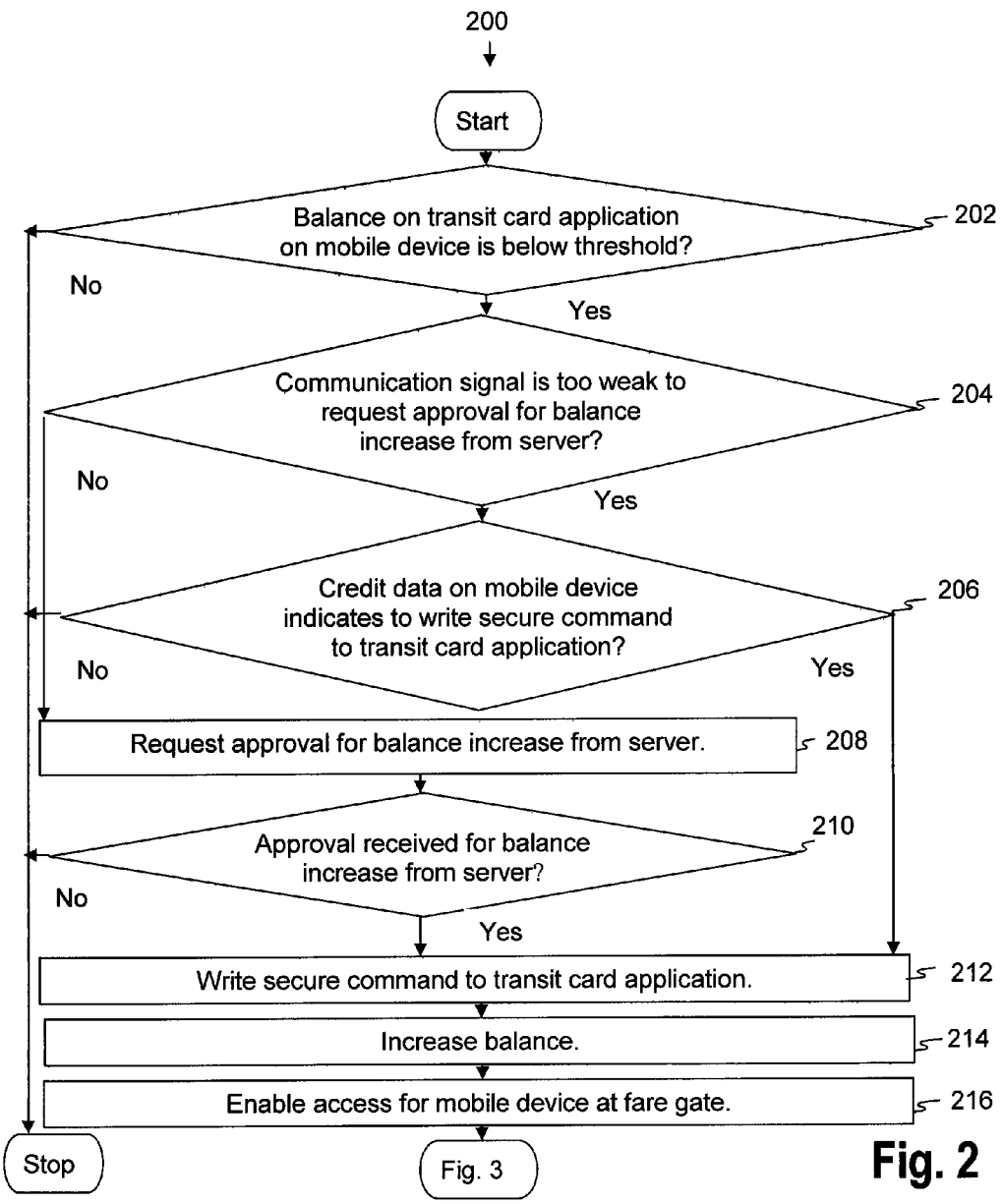
FIG. 2 shows a flowchart of a method for transit card credit authorization according to some embodiments of the present disclosure.

FIG. 2 is a flowchart illustrating a method 200 for transit card credit authorization according to some embodiments of the present disclosure. The authorization component 138 may use the method 200 to increase the balance on the transit card application 118 when the mobile device 102 cannot communicate sufficiently with a predetermined payment source to increase the balance on the transit card application 118.

In box 202, whether a balance on a transit card application on a mobile device is below a threshold is determined. For example, the authorization component 138 determines that the $9.00 balance on the transit card application 118 is below a threshold of $10.00. If the authorization component 138 determines that the balance is below the threshold, the method 200 continues to box 204. If the authorization component 138 determines that the balance is not below the threshold, the method 200 terminates.

In box 204, whether a communication signal is too weak to request approval for a balance increase from a server is determined. For example, the authorization component 138 determines whether a PLMN communication signal is too weak to communicate with the server 124. If the authorization component 138 determines that the PLMN communication signal is too weak, the method 200 continues to box 206. If the authorization component 138 determines that the PLMN communication signal is not too weak, the method 200 proceeds to box 208.

In box 206, whether credit data on the mobile device indicates to write a secure command to the transit card application is determined. For example, the authorization component 138 determines whether the credit data 136 indicates to write a secure command to the transit card application 118. If the credit data 136 indicates to not write the secure command, the method 200 terminates. If the credit data 136 indicates to write the secure command, the method 200 proceeds to box 212.

In box 208, approval for a balance increase is requested from a server. For example, the mobile device 102 requests approval for a balance increase of $40.00 from the server 124 to increase the balance on the transit card application 118 from $9.00 to $49.00.

In box 210, whether approval is received for the balance increase from the server is determined. For example, the mobile device 102 determines whether the server 124 approves the $40.00 balance increase. If the mobile device 102 determines that the approval is received, the method 200 continues to box 212. If the mobile device 102 determines that approval is not received, the method 200 terminates.

In box 212, a secure command is written to the transit card application. For example, the authorization component 138 writes the secure command to the transit card application 118 for increasing the balance, indicating that the predetermined payment source has sufficient value or that the credit data 136 indicates to write the secure command.

In box 214, the balance on the transit card application is increased. For example, the fare gate 112 increases the balance by $40.00.

In box 216, access is enabled for the mobile device at the fare gate. For example, the fare gate 112 enables access for the mobile device 102 at the fare gate 112.

Figure 3:
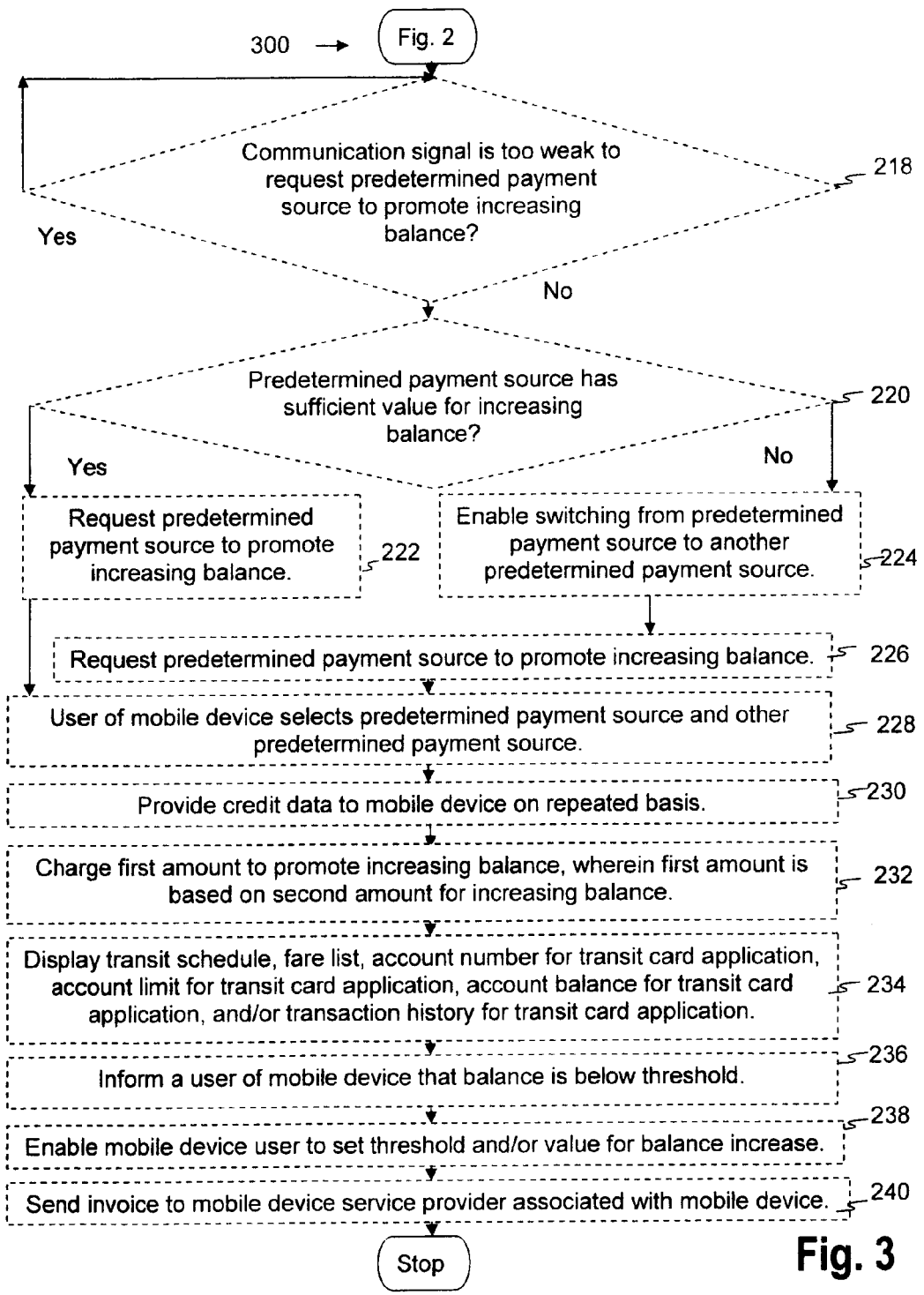
FIG. 3 shows a flowchart of another method for transit card credit authorization according to some embodiments of the present disclosure.

FIG. 3 shows a flowchart of a method 300 for increasing the balance when the communication signal was initially too weak to request a predetermined payment source to promote increasing the balance according to some embodiments of the present disclosure. The system 100 can execute the method 300 to request the predetermined payment source to promote increasing the balance, to switch from one predetermined payment source to another, and to display transit card application information to the mobile device user.

In box 218, whether a communication signal is too weak to request the predetermined payment source to promote increasing the balance is optionally determined. For example, the mobile device 102 determines whether the PLMN communication signal is too weak to request increasing the balance. If the mobile device 102 determines that the PLMN communication signal is not too weak, the method 300 continues to box 220. If the mobile device 102 determines that the PLMN communication signal is too weak, the method 300 loops back to box 218 to continue checking the PLMN communication signal.

In box 220, whether a predetermined payment source has sufficient value for increasing the balance is optionally determined. For example, the authorization component 138 determines whether a credit card associated with the server 124 has sufficient value for increasing the balance. If the predetermined payment source has sufficient value, the method 300 continues to box 222. If the predetermined payment source does not have sufficient value, the method 300 proceeds to box 224.

In box 222, the predetermined payment source is optionally requested to promote increasing the balance. For example, the mobile device 102 requests the credit card associated with the server 124 to promote increasing the balance, and the method 300 continues to box 228.

In box 224, switching from the predetermined payment source to another predetermined payment source is optionally enabled. For example, the mobile device 102 enables switching from one credit card that is close to exceeding its credit limit to another credit card that is not close to exceeding its credit limit. The mobile device 102 may display selections of other predetermined payment sources on the user interface 134 from which the user of the mobile device 102 can select.

In box 226, a predetermined payment source is optionally requested to promote increasing the balance. For example, the mobile device 102 requests the second credit card to promote increasing the balance.

In box 228, the predetermined payment source and the other predetermined payment source are optionally selected by the user of the mobile device 102. For example, the mobile device user employs the user interface 134 to select the first smart card application 120 as the default payment source and the second smart card application 122 as the backup payment source prior to presenting the mobile device 102 to the fare gate 112 or the balance on the transit card application 118 falling below the threshold.

In box 230, credit data is optionally provided to the mobile device on a repeated basis. For example, the server 124 provides the credit data 136 on a daily basis.

In box 232, a first amount to promote increasing balance is optionally charged, wherein the first amount is based on a second amount for increasing the balance. For example, the predetermined payment source charges a $40.00 balance increase and an additional $4.00 balance increase fee to promote increasing the balance by $40.00.

In box 234, a transit schedule, a fare list, an account number for the transit card application, an account limit for the transit card application, an account balance for the transit card application, and/or a transaction history for the transit card application are optionally displayed. For example, the user interface 134 displays the account balance of $49.00 for the transit card application 118.

In box 236, a user of the mobile device is optionally informed that the balance is below the threshold. For example, the user interface 134 informs the mobile device user that the balance is below the threshold of $10.00.

In box 238, the mobile device 102 optionally enables a user to set the threshold and/or a value for the balance increase. For example, the user of the mobile device 102 employs the user interface 134 to modify the balance increase from $40.00 to $80.00, thereby reducing the number of subsequent balance increase requests.

In box 240, an invoice is optionally sent to a mobile device service provider associated with the mobile device. For example, the fare gate 112 sends an invoice to a mobile device service provider for the $40.00 balance increase provided to the mobile device 102. The transit authority may collect the invoice amount from the mobile device service provider or charge a third party source with the customer's permission.

Figure 4:
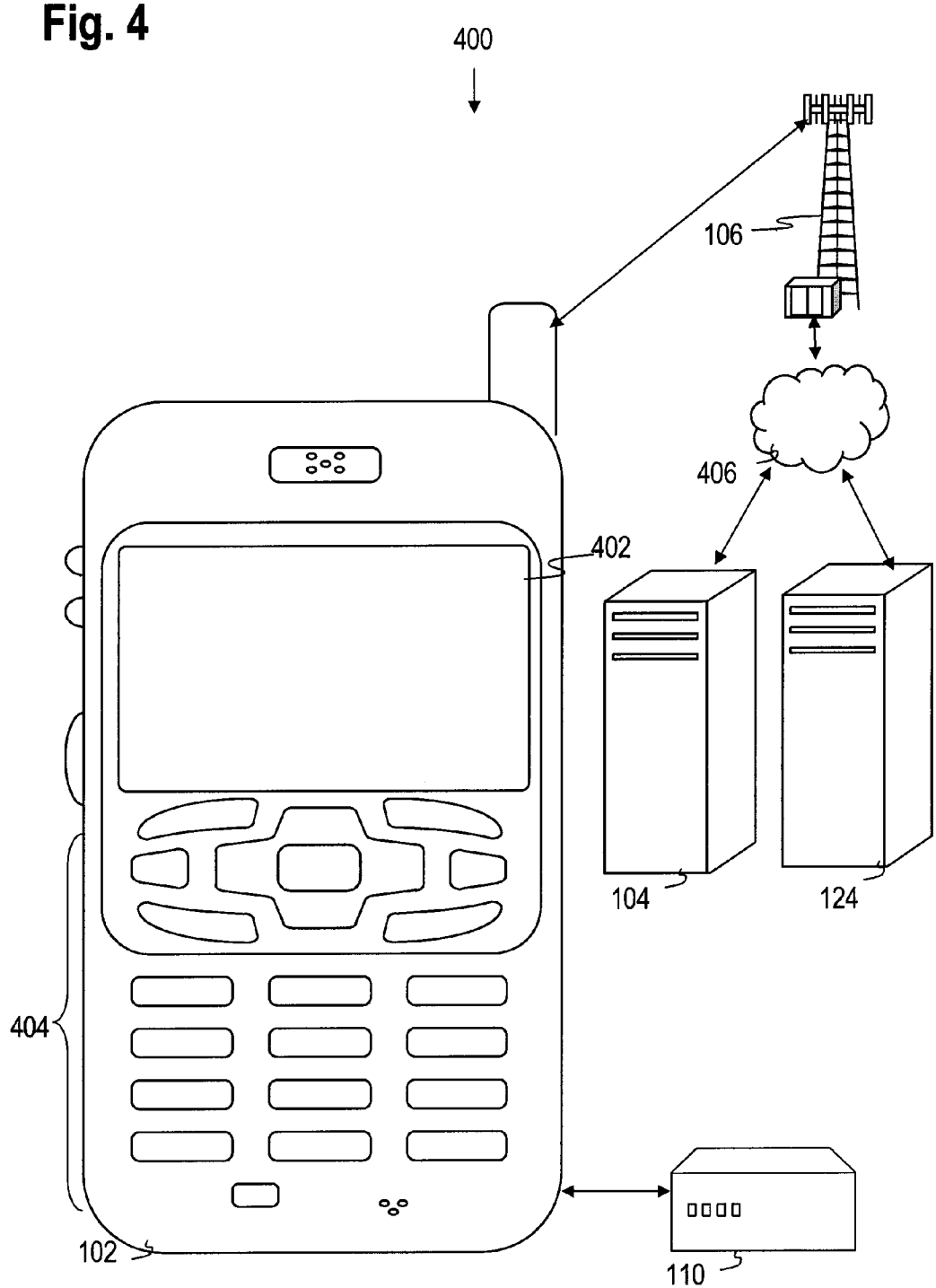
FIG. 4 shows an illustrative wireless communications system.

FIG. 4 shows a wireless communications system 400 including the mobile device 102. FIG. 4 depicts the mobile device 102, which is operable for implementing aspects of the present disclosure, but the present disclosure should not be limited to these implementations. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, a mobile computer, and/or other. Many suitable mobile devices 102 combine some or all of these functions. In some embodiments of the present disclosure, the mobile device 102 is not a general purpose computing device like a mobile, portable, laptop or tablet computer, but rather the mobile device 102 may be a special-purpose communications device with a screen size reduced to a maximum of 4 inches by 6 inches. For example, the mobile device 102 may be a mobile telecommunication device, a handheld gaming device, a handheld wireless mobile device, a digital camera, a digital musical player, a digital calculator, a mobile phone, a mobile handset, a pager, or PDA. The mobile device 102 may support specialized activities such as gaming, inventory control, job control, and/or task management functions, and so on.

The mobile device 102 includes a display 402 and a touch-sensitive surface or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device 102. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 402 to show a web page. The web page may be obtained via wireless communications with a base transceiver station (BTS) 106, a wireless network access node, a peer mobile device 102 or any other wireless communication network or system. While a single base transceiver station 106 is illustrated, it is understood that the wireless communication system may comprise additional base transceiver stations 106. In some instances, the mobile device 102 may be in communication with multiple base transceiver stations 106 at the same time. The base transceiver station 106 (or wireless network access node) is coupled to a wired network 406, such as the Internet. Via the wireless link and the wired network, the mobile device 102 has access to information on various servers, such as the server 104. The server 104 may provide content that may be shown on the display 402. Alternately, the mobile device 102 may access the base transceiver station 106 through a peer mobile device 102 acting as an intermediary, in a relay type or hop type of connection.

The server 104 may interact with the payment source server 124 through the wired network 406. While two servers are shown in FIG. 4, other servers could be present. The server 104 may act as a gateway to the payment source server 124, which may include information needed by the electronic wallet 130 to verify whether to increase the balance on transit card and smart card applications 118-122 on the smart card 110. The payment source server 124 may interact with the server 104, which may communicate with the mobile device 102 through the wired network 406 and the base transceiver station 106 by a standard wireless telephony protocol (such as code division multiple access), a wireless internet connection, or some other means of wireless communication.

Figure 5:
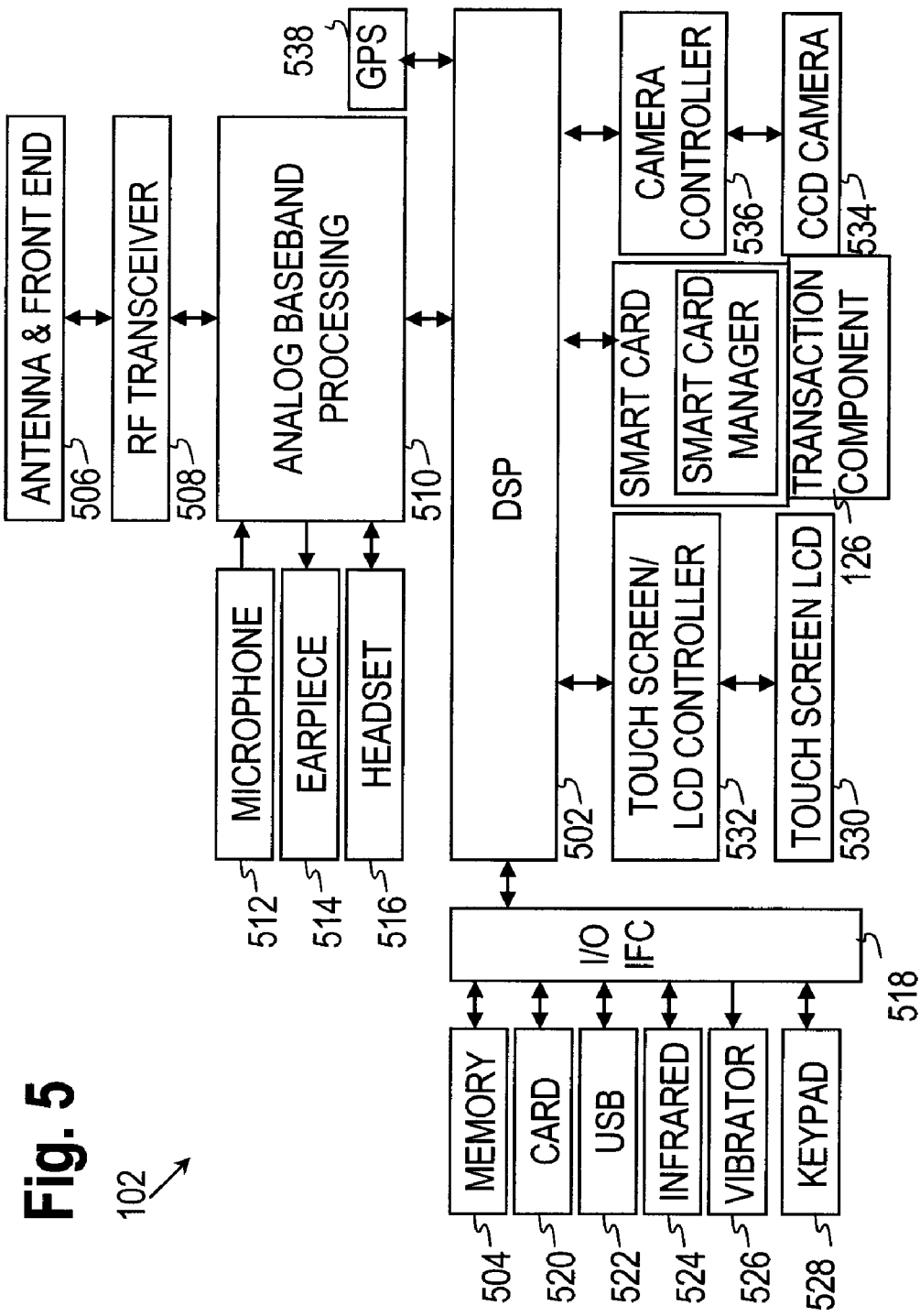
FIG. 5 shows a block diagram of an illustrative mobile device.

FIG. 5 shows a block diagram of the mobile device 102. While a variety of known components of mobile devices 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, a global positioning system (GPS) sensor 538, the smart card 110, the smart card manager 116 for the smart card 110, and the transaction component 126. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs). In some contemplated systems, the mobile device 102 is able to wirelessly exchange information at a point-of-sale when placed near a suitable transceiver, such as the fare gate 112.

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby mobile devices 102 and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 6:
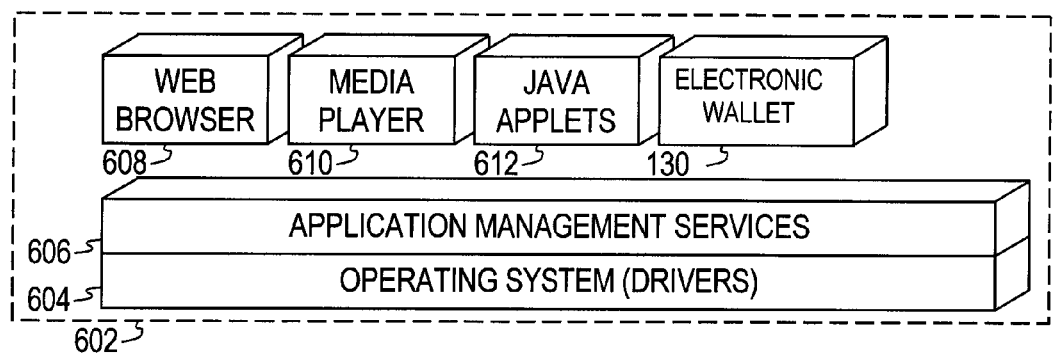
FIG. 6 shows a block diagram of an illustrative software configuration for a mobile device according to some embodiments of the present disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the mobile device hardware with standardized interfaces that are accessible to application software. The operating system drivers 604 include application management services ("AMS") 606 that transfer control between applications running on the mobile device 102. Also shown in FIG. 6 are a web browser application 608, a media player application 610, JAVA applets 612, and the electronic wallet 130. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality. The electronic wallet 130 may obtain user input from the keys 404, the keypad 528 or the liquid crystal display (LCD) with a touch sensitive surface 530 through the touch screen/LCD controller 532, and may present output to a mobile device user through the display 402.

Figure 7:
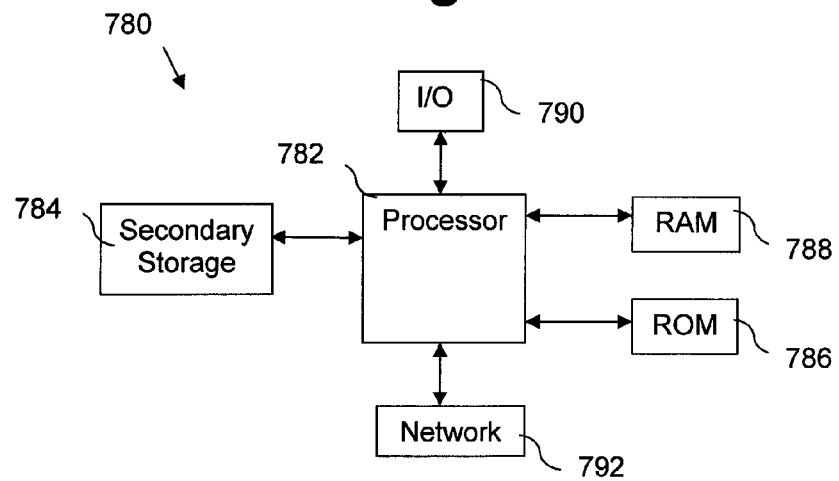
FIG. 7 shows an illustrative general purpose computer system suitable for implementing portions of the several embodiments of the present disclosure.

Some aspects of the system described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for transit card credit authorization, comprising:
    credit data on a mobile device; and
    an authorization component on the mobile device, wherein the authorization component determines whether a balance on a transit card application on the mobile device is below a threshold, determines whether a communication signal is too weak to request an approval for a balance increase from a server in response to a determination that the balance on the transit card application is below the threshold, determines whether the credit data authorizes increasing the balance in response to a determination that the communication signal is too weak to request the approval for the balance increase from the server, and authorizes increasing the balance in response to a determination that the credit data authorizes increasing the balance,
    wherein a fare gate enables access for the mobile device at the fare gate in response to the authorization component authorizing increasing the balance.

2. The system of claim 1, wherein the authorization component determines whether a predetermined payment source has sufficient value for increasing the balance, requests the predetermined payment source to promote increasing the balance in response to a determination that the predetermined payment source has sufficient value for increasing the balance, and enabling switching from the predetermined payment source to another predetermined payment source in response to a determination that the predetermined payment source does not have sufficient value for increasing the balance.

3. The system of claim 2, wherein a user of the mobile device selects the predetermined payment source and the other predetermined payment source.

4. The system of claim 1, wherein the authorization component determines whether the communication signal is too weak to request a predetermined payment source to promote increasing the balance in response to promoting increasing the balance, and requests the predetermined payment source to promote increasing the balance in response to a determination that the communication signal is not too weak to request the predetermined payment source to promote increasing the balance.

5. The system of claim 4, wherein the predetermined payment source is at least one of a smart card application on the mobile device, a loyalty card, an identification card, a credit card, a coupon card a security card, a debit card, a bank account, a mobile device service provider bill, a cash card, and another mobile device that has an electronic wallet.

6. The system of claim 4, wherein the predetermined payment source charges a first amount to promote increasing the balance, wherein the first amount is based on a second amount for increasing the balance.

7. The system of claim 1, wherein the credit data is based on a usage of a transit system, a timeliness of payments, a length of time that a mobile device user is a customer, a credit score associated with the mobile device user, an average payment amount, a frequency of increasing the balance, a report of a cancelled account, and a report of mobile device theft.

8. The system of claim 1, wherein the server provides the credit data to the mobile device on a repeated basis, the credit data specifies when the server provided the credit data to the mobile device, and the authorization component determines whether the credit data authorizes increasing the balance credit data based on when the server provided the credit data to the mobile device.

9. The system of claim 1, wherein the mobile device is one of a mobile computer, a portable computer, a tablet computer, and a laptop computer.

10. The system of claim 1, wherein the mobile device has a reduced screen size and is one of a mobile telecommunication device, a mobile handset, a personal digital assistant, a handheld gaming device, a handheld wireless mobile device, a pager, a digital camera, a digital music player, a mobile phone, and a digital calculator.

11. The system of claim 1, wherein the credit data specifies an amount for increasing the balance.

12. The system of claim 1 wherein the authorization component determines whether the balance on the transit card application is below the threshold in response to one of a fare gate event, a period of time passed, and a request by a user of the mobile device to access information for the transit card application.

13. The system of claim 1, wherein the mobile device promotes communication with the fare gate via one of a contact communication and a contact-less communication for the transaction, wherein the communication is further defined as one of a radio frequency communication, optical communication, and infra-red communication.

14. A method for transit card credit authorization comprising:
- determining, by an authorization component stored on a mobile device and executable by a processor, whether a balance on a transit card application on a mobile device is below a threshold;
- determining, by the authorization component, whether a communication signal is too weak to request an approval for a balance increase from a server in response to a determination that the balance on the transit card application is below the threshold;
- requesting, by the authorization component, the approval for the balance increase from the server in response to a determination that the communication signal is not too weak to request the approval for the balance increase from the server;
- receiving, by the authorization component, the approval for the balance increase from the server in response to requesting the approval for the balance increase from the server;
- determining, by the authorization component, whether credit data on the mobile device authorizes to write a secure command to the transit card application in response to a determination that the communication signal is too weak to request the approval for the balance increase from the server;
- writing, by the authorization component, a secure command to the transit card application in response to one of a determination that the credit data authorizes to write the secure command to the transit card application and receiving the approval for the balance increase from the server;
- increasing the balance in response to the authorization component writing the secure command to the transit card application; and
- enabling access for the mobile device at a fare gate.

15. The method of claim 14, further comprising displaying at least one of a transit schedule, a fare list, an account number for the transit card application, an account limit for the transit card application, an account balance for the transit card application, and a transaction history for the transit card application on a user interface on the mobile device.

16. The method of claim 14, further comprising informing a user of the mobile device that the balance is below the threshold.

17. The method of claim 14, further comprising enabling a user of the mobile device to set at least one of the threshold and a value for the balance increase.

18. A system for transit card credit authorization, comprising:
- credit data on a mobile device; and
- an authorization component on the mobile device, wherein the authorization component determines whether a balance on a transit card application on the mobile device is below a threshold, determines whether a communication signal is too weak to request an approval for a balance increase from a server in response to a determination that the balance on the transit card application is below the threshold, determines whether the credit data authorizes to write a secure command to the transit card application in response to a determination that the communication signal is too weak to request the approval for the balance increase from the server, and writes a secure command to the transit card application in response to a determination that the credit data authorizes to write the secure command to the transit card application,
- wherein a fare gate increases the balance in response to the authorization component writing the secure command to the transit card application, and enables access for the mobile device at the fare gate.

19. The system of claim 18 wherein the fare gate sends an invoice to a mobile device service provider associated with the mobile device.

20. The system of claim 18 wherein the authorization component determines whether the credit data authorizes to write a secure command to the transit card application based on at least one of a duration of time that the communication signal is too weak to request the approval for the balance increase from the server and a total amount associated with each request for approval for the balance increase from the server while the communication signal is too weak to request the approval for the balance increase from the server.

\* \* \* \* \*